July 4, 1961 J. KARLOVSKY 2,991,059
RETRACTIBLE CORNER SPROCKET FOR BORING TYPES
OF CONTINUOUS MINING MACHINES
Filed Feb. 21, 1958 5 Sheets-Sheet 1

INVENTOR.
Jerry Karlovsky
BY
Murray G. Gleeson
ATTORNEY

INVENTOR.
Jerry Karlovsky
BY
Murray G. Gleeson
ATTORNEY

INVENTOR.
Jerry Karlovsky
BY
Murray G. Gleeson
ATTORNEY

INVENTOR.
Jerry Karlovsky
BY
Murray G. Gleeson
ATTORNEY

INVENTOR.
Jerry Karlovsky
BY
Murray G. Gleeson
ATTORNEY

United States Patent Office 2,991,059
Patented July 4, 1961

2,991,059
RETRACTIBLE CORNER SPROCKET FOR BORING TYPES OF CONTINUOUS MINING MACHINES
Jerry Karlovsky, La Grange, Ill., assignor to Goodman Manufacturing Company, Chicago, Ill., a corporation of Illinois
Filed Feb. 21, 1958, Ser. No. 716,650
11 Claims. (Cl. 262—7)

This invention relates to improvements in continuous mining machines of the boring type and more particularly relates to a retractible corner sprocket for boring types of continuous mining machines.

Heretofore, retractible corner sprocket devices have been provided on the ends of the lower trimmer bar of continuous boring types of mining machines. These retraction devices have usually been so arranged that they are automatically retractible as the cutter bar is raised and lowered, with the result that the trimmer bar is only suitable for cutting at one height. Also, with such retractible corner sprocket devices considerable difficulty has been experienced in keeping the retractible sprockets in contact with the coal, since the forces tending to retract the corner sprockets against the retracting means, holding the sprockets extended during the cutting operation, have been high enough to pull the operating levers and hydraulic jacks actuating the retracting means for the sprockets from their moorings.

A principal object of the present invention is to remedy the foregoing difficulties by providing a retractible corner sprocket device which is maintained in extended position at various cutting heights to which the trimmer bar may be adjusted, but which is collapsible when the trimmer bar is raised to a height above its minimum cutting height position.

A further object of the invention is to provide a retractible corner sprocket device in which the corner sprocket is positively held in an extended position throughout the entire range of cutting of the machine, and is released for retraction by its retractible actuating devices, when the trimmer bar is elevated to accommodate tramming of the machine about the mine.

These and other objects of the invention will appear from time to time as the following specification proceeds and with reference to the accompanying drawings wherein.

Figure 1:
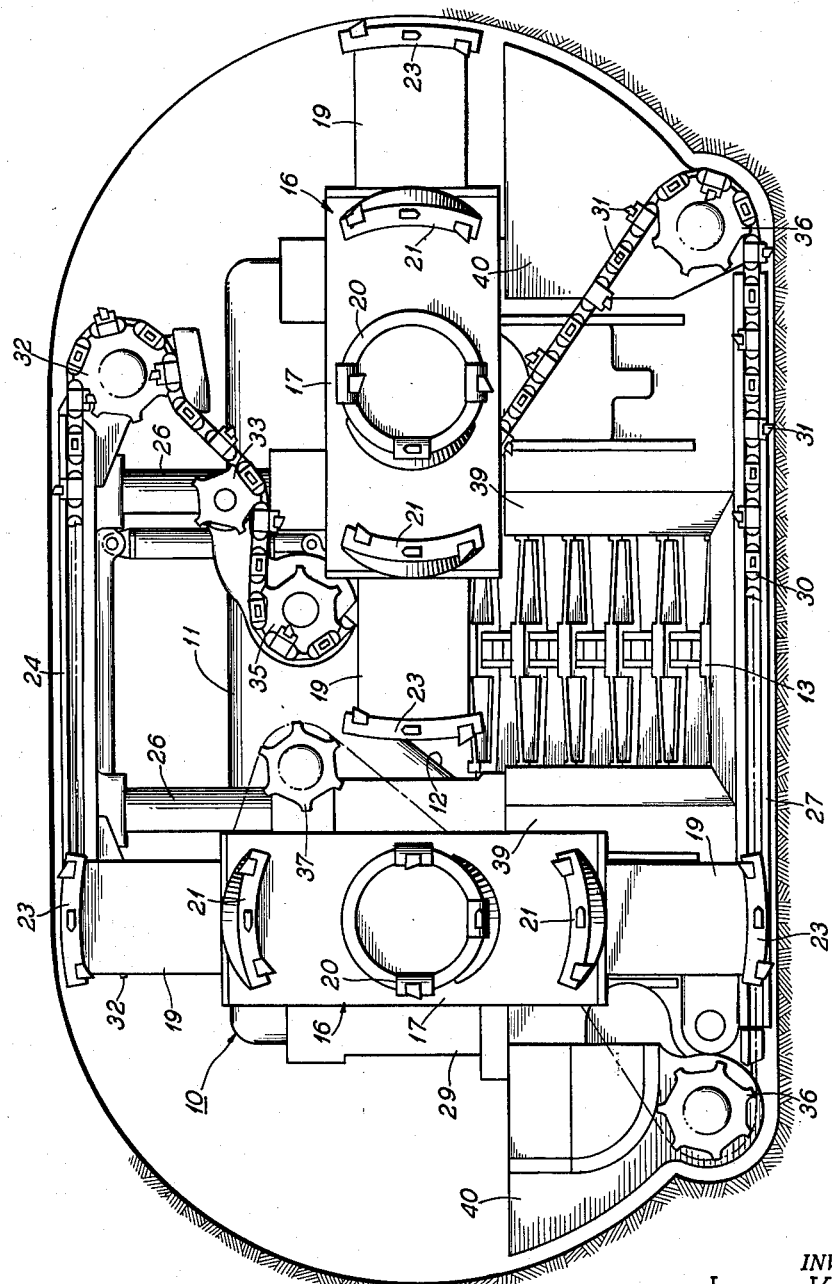
FIGURE 1 is a view in front elevation of a continuous mining machine constructed in accordance with the invention.

In the embodiment of the invention illustrated in the drawings, 10 generally designates a mining machine of the boring type having a transversely extending gear case 11 supported in advance of the main frame of the machine (not shown) for vertical adjustment with respect to the ground. The gear case 11 has a central throat portion 12 providing a passageway to an inclined elevating conveyor 13 for picking up the mined material and transporting it beyond the rear end of the machine for loading into shuttle cars (not shown) and the like.

The gear case 11 has spaced hubs 15 projecting forwardly therefrom on opposite sides of the throat 12 and elevating conveyor 13, and forming bearing supports for spaced rotatable boring heads 16. The boring heads 16 are shown in FIGURE 1 as being positioned to cut in intersecting paths out of phase with respect to each other, and each comprises an arm 17 having radially adjustable arms 19, 19 carried thereby for adjustable movement toward and from the axis of rotation of the boring head, to accommodate the diameter of the bore to be adjusted. As herein shown, the arm 17 has annular cutters 20 arranged to cut an annular pilot hole about the axis of rotation of the boring head, and has forwardly projecting cutters 21 projecting forwardly therefrom, adjacent the outer ends thereof, for cutting an annular kerf in outwardly spaced relation with respect to the pilot cutters 20. The radially adjustable arms 19 also have forwardly projecting cutters 23 projecting forwardly from the outer ends thereof for cutting an annular kerf in outwardly spaced relation with respect to the cutters 21.

An upper cutter bar 24 extends between the boring heads 16, adjacent the upper limits of the paths of travel thereof, for cutting out the depending cusps of unmined coal left between the boring heads 16. The upper cutter bar 24 is mounted on the gear case 11 for vertical adjustment relative thereto, by means of jacks 26 in a well known manner, and no part of the present invention, so not herein shown or described further.

A lower cutter bar 27 is mounted to cut adjacent the mine floor between and beyond the paths of travel of the boring heads 16, to cut the upstanding cusps extending upwardly from the mine floor between the boring heads 16, and to trim the floor along opposite sides of the annular cutting paths of the boring heads. The lower cutter bar 27 is mounted on the gear casing 11 to depend therefrom, by means of a pair of laterally spaced fluid pressure jacks 29.

A trimmer cutter chain 30 having cutter bits 31 projecting forwardly therefrom, is guided for movement along the upper and lower cutter bars 24 and 27 and is trained about corner sprockets 32 at opposite ends of the upper cutter bar 24, under a tension idler 33, serving to take up tension on the trimmer chain 30 upon vertical adjustment of the cutter bars 24 and 27 toward and from each other. From the tension idler 33 the trimmer chain 30 is trained about a drive sprocket 35, and lower corner sprockets 36, 36 supported beyond opposite ends of the lower cutter bar 27. The trimmer chain then extends upwardly from the corner sprocket 36, shown in FIGURE 1 as being the left hand corner sprocket, to and around an idler sprocket 37, shown as being in horizontal alignment with, but being spaced laterally from the drive sprocket 35. From thence, the trimmer chain 30 is trained about the left hand upper corner sprocket 32 to the cutter bar 24, guiding said trimmer chain for horizontal movement therealong.

A cuttings confining means is provided to confine the mined coal to flow toward the conveyor 13 to be picked up thereby and to form a barrier in advance of the main frame of the machine and behind the trimmer chain 30 and mining heads 16. The cuttings confining means is herein shown as including generally vertically extending pusher plates 39, extending along opposite sides of the conveyor 13 and mounted on and extending upwardly from the cutter bar 27. The cuttings confining means also includes wing plates 40 pivotally mounted on bearing support shafts 41 for the sprockets 36 for free pivotal movement about said shafts. The wing plates 40 are formed to conform generally to the cut made by the boring heads 16 and trimmer chain 30 and are provided with spaced rib engaging shoes 43, which ride along the curved ribs left by the boring heads, under the broken and dislodged material, to hold the wing plates 40 outwardly in engagement with the rib of the working place. Said cuttings confining means including the pusher plates 39 and wing plates 40 are no part of the present invention so need not herein be shown or described further.

The retractible corner sprockets on each side of the conveyor and the retracting means therefor, as well as the cuttings confining means, are of a similar construction, so the retractible corner sprockets and cuttings confining means on one side of the conveyor only need herein be shown and described in detail.

Figure 2:
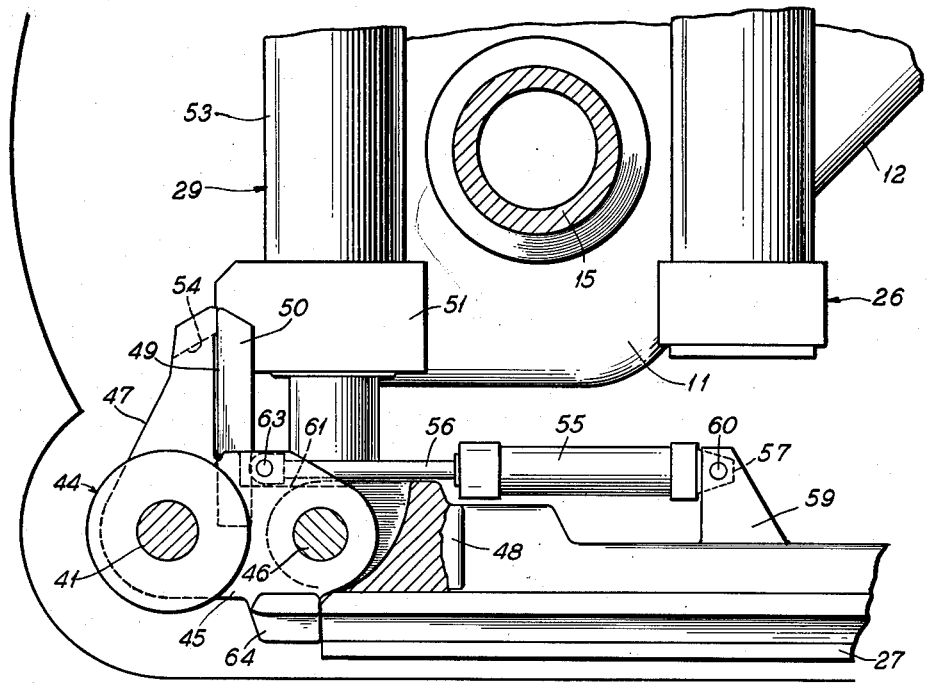
FIGURE 2 is a fragmentary front view of a portion of the machine with certain parts removed and certain parts shown in transverse section in order to show the corner sprocket support in a fully extended position and the cutter bar in a lower cutting position.
Figure 3:
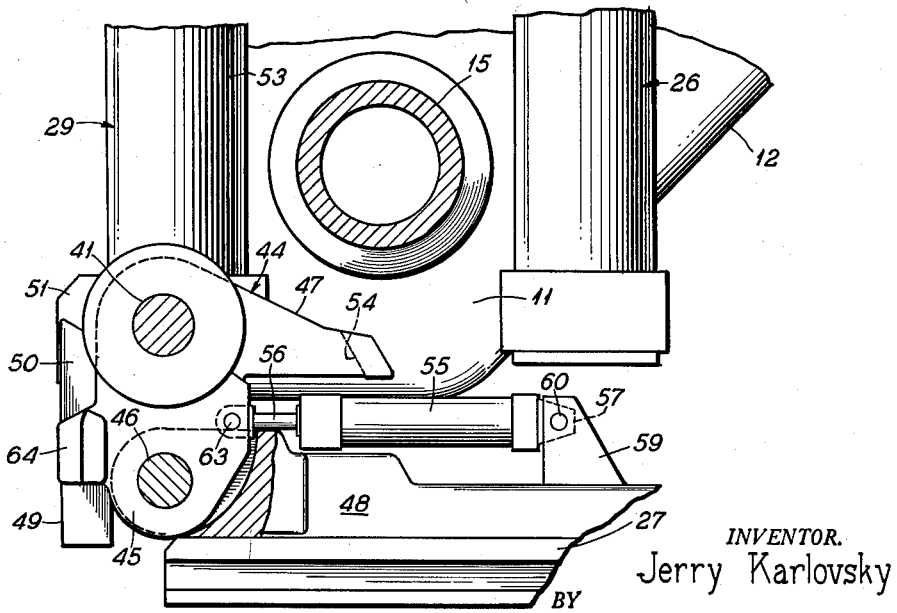
FIGURE 3 is a fragmentary front view with certain parts shown in transverse section, somewhat similar to FIGURE 2, but showing the corner sprocket support in a fully retracted position.
Figure 4:
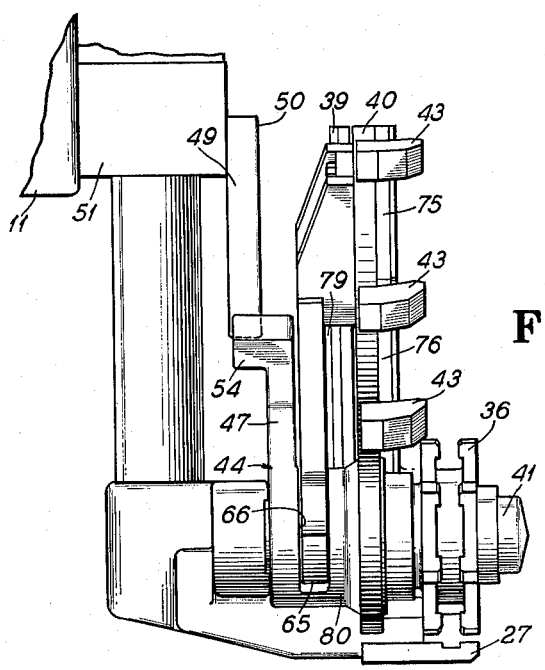
FIGURE 4 is a fragmentary side elevational view of the retraction mechanism and cuttings confining means, with the corner sprocket and cuttings confining means in extended positions.

Referring now to FIGURES 2 and 3, illustrating the means for holding the corner sprockets 36 in their extended positions as the cutter bar 27 is elevated or lowered, to position the trimmer chain 30 to cut at various desired cutting heights, the shaft 41 for the corner sprocket 36, shown in FIGURE 1 as being the left hand corner sprocket when looking at the machine, from the front end thereof, is shown in FIGURES 2 and 3 as being mounted at the apex of a bellcrank 44. Said bellcrank has an arm 45 mounted on a pivot pin 46. Said pivot pin is mounted on a support 48, extending upwardly from the cutter bar 27. The bellcrank 44 also has an arm 47 extending generally at right angles to the arm 45, upwardly from the shaft 41 along a vertical face 49 of a retainer cam 50. The cam 50 is mounted on the outer side of a support bracket 51 for the lower end of a cylinder 53 of the hydraulic jack 26, and extends downwardly therealong and depends therefrom (FIGURES 2 and 4). The arm 47 has an inwardly extending lip 54 having slidable engagement with the vertical face 49 of the retainer cam 50, as the cutter bar 27 is adjustably moved into its various cutting positions. As, however, the cutter bar is moved upwardly beyond a minimum cutting position, the lip 54 may then pass over the upper end of the cam 50 and accommodate inward movement of the bellcrank 44 about the axis of the shaft 46, to retract the corner sprocket 36.

The bellcrank 44 is actuated to extensibly and retractibly move the corner sprocket 36 into its extended operative position or into its inwardly retracted position by means of a fluid pressure cylinder 55 having a piston rod 56 extensible therefrom. The cylinder 55 is shown as having spaced ears 57 extending rearwardly from the head end thereof along opposite sides of a bracket plate 59 on the cutter bar 27, and pivotally connected to said bracket plate as by a pivot pin 60. The piston rod 56 extends within an upwardly opening recessed portion 61 of the arm 45 of the bellcrank 44, and is pivotally connected thereto as by a pivot pin 63. The arm 45 of the bellcrank 44 also has a depending lug 64 abutting an end portion of the cutter bar 27 at its inner face and forming a stop, limiting extensible movement of the bellcrank 44 and corner sprocket 36 and cooperating with the lip 54 and face 49 of the cam 50, to retain the bellcrank 44 and corner sprocket 36 in the extended position shown in FIGURES 2 and 4, as the cutter bar 27 is vertically adjusted into its various cutting positions.

Figure 5:
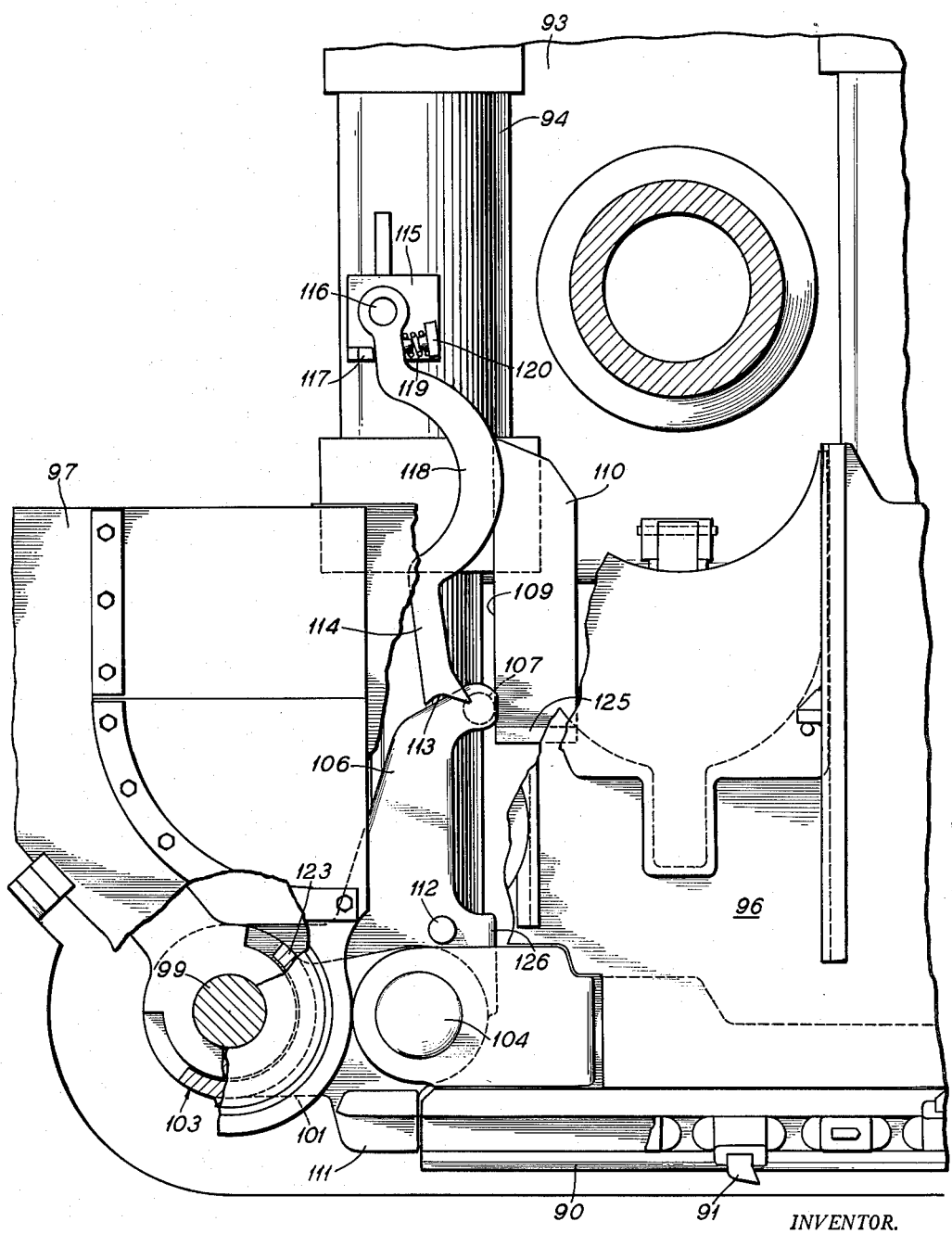
FIGURE 5 is a fragmentary front view showing a modified form of sprocket retraction device constructed in accordance with the principles of the present invention, with the sprocket retraction device in an extended position, and certain parts broken away and certain other parts shown in transverse section in order to show the details thereof.
Figures 6, 7:
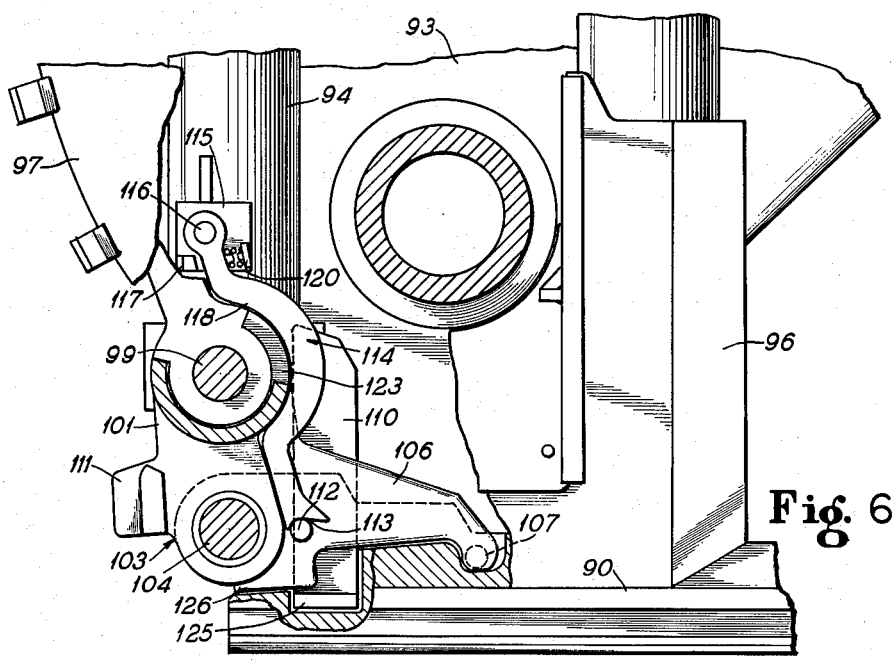
FIGURE 6 is a fragmentary front view somewhat similar to FIGURE 5, but showing the sprocket retraction device in a retracted position.
FIGURE 7 is a fragmentary side elevational view of the retraction mechanism in the extended position shown in FIGURE 6, with certain parts broken away and certain other parts shown in section.

Referring now to the modification of the invention shown in FIGURES 5, 6, and 7, in this form of the invention, the corner sprockets at opposite ends of the cutter bar are retracted mechanically rather than by the operation of a hydraulic cylinder and piston. A lower cutter bar 90 like the cutter bar 27 has a trimmer chain 91 guided for movement therealong, as in the form of the invention illustrated in FIGURES 1 through 4. The cutter bar 90 is suspended from a gear case 93 on spaced fluid pressure operated jacks 94.

A cuttings confining means including pusher plates 96 and wing plates 97 like the pusher plates 39 wing plates 40 shown in the form of my invention illustrated in FIGURES 1 through 4 are provided to confine the cuttings to be picked by the conveyor of the machine.

Shafts 99 at opposite ends of the cutter bar 90 support corner sprockets 100 beyond the ends of the cutter bar 90. Each shaft 99 is mounted on an arm 101 of a bellcrank 103 and extends forwardly therefrom. Said bellcrank is pivotally supported from an upstanding projection 105, at the end of the cutter bar 90. The bellcrank 103 also has an arm 106 extending from the apex thereof at generally right angles to the arm 101 and having a stud 107 projecting inwardly of the outer or upper end thereof, for slidable engagement along a vertical face 109 of a cam 110, for retaining the bellcrank and corner sprocket in the extended position shown in FIGURE 5 in the normal cutting positions of the cutter bar 90.

The bellcrank 103 also has a lug 111 extending outwardly and downwardly from the arm 101, and abutting an end portion of the cutter bar 90, to limit movement of the bellcrank and corner sprocket 100 beyond their extended positions.

A stud 112 projects forwardly from the arm 106 of the bellcrank 103, adjacent and spaced outwardly of the pivotal axis of the bellcrank 103. The stud 112 is engageable by a recessed lower end portion 113 of a dog 114, pivotally mounted on the gear casing 93 and depending therefrom. The dog 114 serves to move the bellcrank 103 and corner sprocket 100 into a retracted position, as the stud 107 moves upwardly beyond the upper end of the vertical face 109 of the cam 110, as when the cutter bar 90 is elevated into a tramming position.

The dog 114 is pivotally mounted on a bracket 115, projecting forwardly of the gear case 93, on a pivot pin 116. Said dog 114 is biased against a stop 117 by a compression spring 119, seated between a lug 120 on the bracket 115 and the opposite side of the dog 114 from the stop 117. The spring 119 thus holds the dog 114 in position to engage the stud 112 and pivot the bellcrank 103 about the axis of the pivot pin 104, to retract the corner sprocket 100, as the cutter bar 90 is elevated a distance sufficient to cause the stud 107 to travel upwardly beyond the end of the vertical face 109 of the cam 110.

The dog 114 has an intermediate bowed portion 118, which is shown in FIGURE 6 as being bowed inwardly to accommodate an enlarged support portion 123 for the shaft 99, at the outer end of the lever 101 of the bellcrank 103, to be recessed thereinto, when the bellcrank is in its fully retracted position.

The cam 110 is also provided with a forwardly projecting lip 125 at its lower end, which is shown in FIGURE 6 as engaging an adjacent surface 126 of the bellcrank 103, to return the bellcrank to the fully extended chain supporting position of FIGURE 5, as the cutter bar 90 is lowered into a cutting position.

It should here be understood that when the bellcrank 103 is in its retracted position as the cutter bar 90 is lowered, that relative movement between the lip 125 and the adjacent surface 126 will first pivot the bellcrank 103 in a direction, which in FIGURE 6 is shown as being a counterclockwise direction, to clear the stud 107 with the upper end of the cam 110, and that upon continued lowering movement of the cutter bar the stud 107 will move along the vertical face 109 of the cam 110, to positively hold the bellcrank and the corner sprocket 100 in its fully extended chain guiding position, with the lug 111 abutting the end portion of the cutter bar, and limiting extensible movement of said bellcrank.

Although I have herein shown and described several embodiments of my invention, it should be understood that various changes and modifications of the invention may be made without departing from the spirit and scope of the novel concepts of the invention, as defined by the claims appended hereto.

I claim as my invention:

1. In a mining machine having a frame, a horizontally disposed trimmer bar mounted in advance of said frame and having a cutter chain movable thereabout for cutting in front of said frame, jack means for supporting said trimmer bar on said frame and adjusting said trimmer bar vertically to various cutting heights relative to said frame, direction changing means at one end of said trimmer bar for changing the direction of said cutter chain, lever means pivotally connected with said trimmer bar and forming a movable support for said direction changing means during a predetermined working range of said trimmer bar relative to said frame, means for holding said lever means and direction changing means in extended position comprising a cam fixed on said frame and engageable by a portion of said lever means offset from its pivotal axis, and releasing said lever means to accommodate retraction thereof when said trimmer bar is moved vertically in a position above said predetermined range of vertical adjustment, and means for retractibly moving said lever means and direction changing means when said trimmer bar is elevated above said predetermined range of vertical adjustment.

2. A mining machine in accordance with claim 1 wherein the means for retractibly moving said lever means and direction changing means comprises a cylinder and piston having operative connection with said lever means at a point offset from its pivotal axis.

3. A mining machine in accordance with claim 1 wherein the means for retractibly moving said lever means and direction changing means carried thereby comprises a dog engageable with said lever means at a point offset from its pivotal axis and pivoting said lever means by relative movement between said trimmer bar and said dog.

4. A mining machine in accordance with claim 3 wherein the dog is pivotally mounted on said frame and is positioned to engage said lever means at a point offset from its pivotal axis upon vertical movement of said trimmer bar above its predetermined working range of vertical adjustment.

5. In a mining machine having a frame, a horizontally disposed trimmer bar mounted on said frame for making a trimmer cut in advance of said frame, a cutter chain guided for movement along said cutter bar, a corner sprocket at one end of said trimmer bar for changing the direction of said cutter chain, lever means pivotally mounted on said trimmer bar and forming a movable support for said corner sprocket positioning said corner sprocket to retain said trimmer bar to its effective cutting length and accommodating retractible movement of said corner sprocket, upon vertical adjustment of said trimmer bar relative to said frame above a predetermined range of vertical adjustment, a cylinder and piston connected between said trimmer bar and said lever means for moving said lever means and corner sprocket into extended and retracted positions with respect to said trimmer bar, and cam means on said frame slidably engaged by said lever means throughout the predetermined range of vertical adjustment of said trimmer bar for maintaining said corner sprocket in its extended position through the predetermined range of vertical adjustment of said trimmer bar relative to said frame and accommodating retractible movement of said lever means and corner sprocket by operation of said cylinder and piston means when said trimmer bar is moved vertically into a position above its predetermined range of vertical adjustment.

6. In a mining machine having a frame, a horizontally disposed trimmer bar, a cutter chain guided for movement along said trimmer bar, means adjustably mounting said trimmer bar on said frame and adjusting said trimmer bar vertically throughout a predetermined working range of vertical adjustment of said trimmer bar relative to said frame and into a position above said predetermined working range, direction changing means mounted at at least one end of said trimmer bar for changing the direction of travel of said cutter chain, movable support means for said direction changing means movably mounted on said trimmer bar and mounting said direction changing means to move into extended and retracted positions with respect to said trimmer bar, and cam means fixed on said frame and slidably engaged by said movable support means during vertical movement of said trimmer bar and effective to hold said direction changing means in extended position throughout said predetermined working range of vertical adjustment of said trimmer bar, and releasing said support means to permit retraction of said direction changing means when said trimmer bar is moved vertically into a position above said predetermined range of vertical adjustment.

7. In a mining machine having a frame, a horizontally disposed trimmer bar, a cutter chain guided for movement along said trimmer bar, means for supporting said trimmer bar on said frame and adjustably moving said trimmer bar vertically throughout a predetermined working range and into position above said predetermined working range, direction changing means for said cutter chain at one end of said trimmer bar, a lever pivotally mounted on said trimmer bar and forming a movable support for said direction changing means, means for moving said lever into extended and retracted positions with respect to said trimmer bar, and cam means fixed on said frame and engaged by a portion of said lever offset from its pivotal axis for holding said lever and direction changing means in extended position with respect to said trimmer bar through said predetermined working range of vertical adjustment of said trimmer bar and accommodating retractible movement of said lever and trimmer bar when said trimmer bar is moved vertically into a position above said predetermined working range of vertical adjustment.

8. In a mining machine having a frame, a horizontally disposed trimmer bar, a cutter chain guided for movement along said trimmer bar, means for supporting said trimmer bar on said frame and adjustably moving said trimmer bar vertically throughout a predetermined working range and into position above said working range, direction changing means for said cutter chain at one end of said trimmer bar, a lever pivotally connected with said trimmer bar and forming a support for said direction changing means, means for moving said lever into extended and retracted positions, and means slidably engaged by said lever during adjustable movement of said trimmer bar throughout said predetermined working range for holding said lever and direction changing means in extended position and accommodating retractible movement of said lever and direction changing means when said trimmer bar is moved vertically into a position above a predetermined working range of vertical adjustment of said trimmer bar, comprising a vertically extending cam fixed to said frame and slidably engaged by a portion of said lever offset from its pivotal axis during vertical adjustment of said trimmer bar throughout said predetermined working range and accommodating movement of said lever and direction changing means upon movement of said trimmer bar into a position above said predetermined working range.

9. In a mining machine having a frame member, a horizontally disposed cutter chain carrying trimmer bar adjustably mounted on said frame, means for adjusting said bar vertically throughout a predetermined cutting range between a contracted position disposed above said cutting range and extended positions within said cutting range, direction changing means at one end of said trimmer bar movable to an operative position for extending the effective length of said trimmer bar, a lever pivotally mounted on said trimmer bar and having said direction changing means mounted on the outer end thereof, means retaining said lever and direction changing means in an extended position with respect to said trimmer bar during adjustment of said trimmer bar throughout said predetermined working range, means for moving said lever and said direction changing means from said operative position concurrently with movement of said trimmer bar upwardly beyond said predetermined working range toward a contracted position comprising a dog pivotally mounted on said frame member for engagement with said lever upon movement of said trimmer bar into a contracted position, and other means for moving said lever toward said operative position concurrently with movement of said trimmer bar toward an extended position, comprising engaging surfaces on said retaining means and lever offset from the pivotal axis of said lever and engageable to pivot said lever toward an operative position upon movement of said trimmer bar in an extending direction.

10. The structure in accordance with claim 10, wherein the retaining means comprises a vertically extending cam fixedly mounted on said frame member and having slidaable engagement with said lever, to retain said lever in operative position throughout the predetermined range of cutting adjustment of said trimmer bar, and wherein said cam disengages said lever upon movement of said trimmer bar to its contracted position upwardly beyond said predetermined cutting range.

11. The structure in accordance with claim 10 wherein the cam has an abutment on the lower end thereof and wherein the lever comprises a bellcrank having the direction changing means rotatably mounted on one arm thereof and having an abutment on the other arm thereof engaged by said abutment on the lower end of said cam for moving said lever and direction changing means into an extended position upon movement of said trimmer bar from its contracted position into its working range.

References Cited in the file of this patent

UNITED STATES PATENTS

| | | |
|---|---|---|
| 2,705,624 | Robbins | Apr. 5, 1955 |
| 2,705,625 | Robbins | Apr. 5, 1955 |
| 2,711,889 | Robbins | June 28, 1955 |
| 2,719,709 | Salmons | Oct. 4, 1955 |
| 2,868,529 | Lundquist | Jan. 13, 1959 |
| 2,885,196 | Karlovsky | May 5, 1959 |
| 2,890,033 | Silks | June 9, 1959 |